United States Patent
Nagaraju

(10) Patent No.: US 12,015,976 B2
(45) Date of Patent: Jun. 18, 2024

(54) METHOD AND SYSTEM FOR MANAGING COMMUNICATION IN USER EQUIPMENT WITH PLURALITY OF SUBSCRIBER IDENTITY MODULES

(71) Applicant: SAMSUNG ELECTRONICS CO., LTD., Suwon-si (KR)

(72) Inventor: Sunil Kumar Nagaraju, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 279 days.

(21) Appl. No.: 17/420,630

(22) PCT Filed: Jan. 6, 2020

(86) PCT No.: PCT/KR2020/000188
§ 371 (c)(1),
(2) Date: Jul. 2, 2021

(87) PCT Pub. No.: WO2020/141959
PCT Pub. Date: Jul. 9, 2020

(65) Prior Publication Data
US 2022/0095211 A1    Mar. 24, 2022

(30) Foreign Application Priority Data

Jan. 4, 2019  (IN) .............................. 201941000443
Jan. 3, 2020  (IN) .............................. 201941000443

(51) Int. Cl.
*H04W 48/18*    (2009.01)
*H04W 8/18*     (2009.01)
*H04W 88/06*    (2009.01)

(52) U.S. Cl.
CPC ........... *H04W 48/18* (2013.01); *H04W 8/183* (2013.01); *H04W 88/06* (2013.01)

(58) Field of Classification Search
CPC ...... H04W 48/18; H04W 8/183; H04W 88/06
(Continued)

(56) References Cited

U.S. PATENT DOCUMENTS 8,849,349 B2 * 9/2014 Jeong .................... H04W 8/183
                                                          455/411
9,491,693 B1 * 11/2016 Chuttani ............... H04W 48/16
(Continued)

FOREIGN PATENT DOCUMENTS

CN    104754659 A    7/2015
CN    107079391 A    8/2017
(Continued)

OTHER PUBLICATIONS

International Search Report (PCT/ISA/210) dated Apr. 10, 2020 issued by the International Searching Authority in International Application No. PCT/KR2020/000188.
(Continued)

*Primary Examiner* — Tan H Trinh
(74) *Attorney, Agent, or Firm* — Sughrue Mion, PLLC

(57) ABSTRACT

A method for managing communication in a user equipment including a plurality of subscriber identity modules (SIMs). The method includes detecting that a network service is unavailable to a first SIM among the plurality of SIMS and that a network service is available to a second SIM among the plurality of SIMS; detecting an availability of an in-device hotspot; and providing, to the first SIM for sending data to a network, an access to the in-device hotspot for using the network service available to the second SIM.

20 Claims, 8 Drawing Sheets

(58) Field of Classification Search
USPC .......................................................... 455/558
See application file for complete search history.

(56) References Cited

U.S. PATENT DOCUMENTS

| | | | | |
|---|---|---|---|---|
| 9,603,005 | B2* | 3/2017 | Kim | H04W 8/183 |
| 9,648,491 | B2* | 5/2017 | Chen | H04W 8/183 |
| 2013/0196621 | A1* | 8/2013 | Guday | H04L 43/0876 |
| | | | | 455/406 |
| 2014/0235200 | A1 | 8/2014 | Cai et al. | |
| 2014/0256302 | A1* | 9/2014 | Chirayil | H04W 88/06 |
| | | | | 455/418 |
| 2015/0146707 | A1* | 5/2015 | Jung | H04W 12/068 |
| | | | | 370/338 |
| 2015/0282060 | A1* | 10/2015 | Huang-Fu | H04W 8/205 |
| | | | | 455/435.2 |
| 2016/0112084 | A1* | 4/2016 | Parron | H04L 47/245 |
| | | | | 455/558 |
| 2016/0112941 | A1 | 4/2016 | Desai et al. | |
| 2016/0127422 | A1* | 5/2016 | Basavarajappa | H04L 65/1016 |
| | | | | 455/426.1 |
| 2016/0345377 | A1* | 11/2016 | Lindoff | H04W 76/27 |
| 2016/0353334 | A1 | 12/2016 | Kim et al. | |
| 2017/0094589 | A1* | 3/2017 | Bhasin | H04W 48/18 |
| 2017/0118255 | A1 | 4/2017 | Tsai et al. | |
| 2017/0142613 | A1 | 5/2017 | Singh et al. | |
| 2017/0265114 | A1 | 9/2017 | Sahu et al. | |
| 2018/0007602 | A1* | 1/2018 | Jamadagni | H04W 36/14 |
| 2018/0077728 | A1* | 3/2018 | Shi | H04W 74/0833 |
| 2018/0098238 | A1* | 4/2018 | Saxena | H04W 36/0066 |
| 2018/0115978 | A1 | 4/2018 | Shi et al. | |
| 2018/0183655 | A1 | 6/2018 | Gupta et al. | |
| 2018/0332428 | A1* | 11/2018 | Gupta | H04L 61/5038 |
| 2019/0037386 | A1* | 1/2019 | Dawid | H04W 36/023 |
| 2019/0306898 | A1 | 10/2019 | Goddeti et al. | |
| 2019/0357306 | A1* | 11/2019 | Fong | H04M 1/72448 |

FOREIGN PATENT DOCUMENTS

| | | |
|---|---|---|
| CN | 111328089 A | 6/2020 |
| EP | 3749000 A1 | 12/2020 |
| KR | 10-2016-0140265 A | 12/2016 |
| WO | 2015/158263 A1 | 10/2015 |
| WO | 2018111790 A1 | 6/2018 |

OTHER PUBLICATIONS

Written Opinion (PCT/ISA/237) dated Apr. 10, 2020 issued by the International Searching Authority in International Application No. PCT/KR2020/000188.
Communication dated Feb. 17, 2022 issued by the European Patent Office in European Application No. 20736071.0.
Communication dated Jul. 28, 2023, issued by the National Intellectual Property Administration of P.R. China in Chinese Application No. 202080007347.2.
Communication dated Nov. 30, 2023, issued by the European Patent Office in European Application No. 20736071.0.

* cited by examiner

METHOD AND SYSTEM FOR MANAGING COMMUNICATION IN USER EQUIPMENT WITH PLURALITY OF SUBSCRIBER IDENTITY MODULES

CROSS-REFERENCE TO RELATED APPLICATION(S)

This application is continuation application of International Application No. PCT/KR2020/000188, filed on Jan. 6, 2020, which is based on and claims priority to Indian Provisional Application No. 201941000443, filed on Jan. 4, 2019, and Indian Complete Application No. 201941000443, filed on Jan. 3, 2020, in the Indian Patent Office, the disclosures of which are incorporated by reference herein in their entirety.

BACKGROUND

1. Field

The disclosure relates to wired and wireless communication, and more particularly, to managing communications in user equipment with a plurality of subscriber identity modules.

2. Description of Related Art

User equipment (UE), for example, a smartphone, with multiple or plurality of subscriber identity modules (SIMs) have become widely available and have gained wide popularity. The multiple SIMs can operate either in an active mode or in a standby mode on more than one network. In a UE with a multi-SIM-multi-active (MSMA) mode, for example, a UE with a dual-SIM-dual-active (DSDA) mode, all SIMs may be active at the same time. Such UE also contain multiple radios and supports multiple radio access technologies. Thus, the UE operating in the MSMA mode may actively transmit or receive on different networks at same time. Also, all the SIMs have data connectivity or network service available and therefore can connect via network operator packet data network (PDN), for example, Internet, Intranet, internet protocol (IP) multimedia subsystem (IMS). In a UE with a multi-SIM-multi-standby (MSMS) mode, for example, a UE with the dual-SIM-dual-standby (DSDS) mode, if any one SIM is active, then the rest of the SIM(s) are in a standby mode. Such UE contains single radio supporting multiple radio access technologies and is shared among the SIMs. Thus, the UE operating in the MSMS mode may actively transmit or receive on one network at a time. Also, one SIM has data connectivity or network service available and can connect with via network operator PDN, while other SIMs' are in the standby mode. The availability of the data connectivity or network service on any SIM from among the multiple SIMs is based on selection of the SIM. Such selection can be a default settings in the UE or a user may select the SIM to provide the network services.

Further, text messaging service, also known as short messaging service (SMS), provided by mobile network operators has not evolved much in terms of service features, since its inception. The text messaging service is limited in that it supports limited character length, lacks support for exchanging multimedia, does not provide for read receipts, and various other features that are being provided by contemporary data based applications of today. To address the aforementioned deficiencies of the text messaging service, smartphone manufacturers and mobile network operators collaborated with cellular networks' governing bodies to develop a new standard to replace the conventional text messaging service. As a result, rich communication services (RCS) was developed. The RCS is a part of a new advanced messaging standard. Besides supporting regular text messages, the RCS supports sharing of picture messages, group chats, location sharing, video calling, and other features like read receipts and typing indicators. Thus, the RCS aims to provide service features, more or less, at par with the contemporary data based applications. For availing the RCS, the UE establishes a connection with a RCS network of a communication network. The connection is established through the PDN.

However, the existing protocols are such that simultaneous availing of the RCS on all the SIMs or more than one SIM is not feasible when UE is operating in the MSMS mode. For instance, a PDN is connected using network services of a SIM 1 of a multiple SIM UE. In such case, the RCS can be availed using the SIM 1. Now, if the network service of SIM 1 is used to avail the RCS using a SIM 2 of the UE, the RCS traffic would be dropped by network associated with the SIM 1 as a RCS network of a network associated with the SIM 2 may not be reachable. Even if the RCS traffic reaches the RCS network of the network associated with the SIM 2 via the PDN, the network associated with SIM 2 will drop the traffic because the traffic would not have followed the non-trusted RCS signaling and Media flows. To support the aforementioned flow, new protocols and/or updating of existing protocols including network node updates would have to be performed. In addition, the networks need to have an extra agreement to allow different packets to be forwarded from different networks. Accordingly, this would be a cumbersome task and include lot of changes in networks that are time, resources, and cost intensive.

Referring to FIG. 1, an example network environment 100 including user equipment 102 having a first SIM 104-1 and a second SIM 104-2 is shown. The first SIM 104-1 and the second SIM 104-2 operate in the MSMS mode. The first SIM 104-1 may connect or associate with a first network 106-1. The second SIM 104-2 may connect or associate with a second network 106-2. A connection with a packet data network (PDN) can be established using network service or data connectivity provided by the second SIM 104-2 in default. The first network 106-1 and the second network 106-2 may connect with respective RCS networks through the PDN. The second SIM 104-2 is capable of transferring a RCS data through the second network 106-2 and the PDN using the network service provided by the second network 106-2. The second SIM 104-2 searches for network service for transferring of a RCS data through the first network 106-1 and the PDN. However, in absence of the network service, when the first SIM 104-1 sends the RCS data through the network service available on the second SIM 104-2, the second network 106-2 drops the RCS data (represented by cross sign) since the RCS data is not intended for the second network 106-2 or due to the incapability of connecting to the first network 106-1. Even if the RCS data reaches the second network 106-2 and the second network 106-2 sends the RCS data to the first network 106-1, the first network 106-1 drops the RCS data (represented by cross sign) since the same was not followed the non-trusted RCS signaling and Media flows.

Thus, as described above, although multiple SIMs may support the RCS, owing to hardware restraints, implementation restraints, and cost restraints in the UE operating in the MSMS mode, the RCS may be availed using a single SIM only, at any time instant. In a similar manner, any other type of data such as network application data, voice over long term evolution (VoLTE) data, etc., cannot be sent by other SIMs using the network service available only on one SIM, for example, in the UE operating in the MSMS mode. Thus, the UE and network resources may not be utilized optimally. Therefore, there exists a need to overcome at least one of the aforementioned problems.

SUMMARY

Provided are methods and systems for managing communications in user equipment with a plurality of subscriber identity modules.

According to an aspect of the disclosure, a method for managing communication in a user equipment having a plurality of subscriber identity modules (SIMs) may include detecting that a network service is unavailable to a first SIM among the plurality of SIMs and that a network service is available to a second SIM among the plurality of SIMs; detecting an availability of an in-device hotspot; and providing, to the first SIM for sending data to a network, an access to the in-device hotspot for using the network service available to the second SIM.

According to another aspect of the disclosure, a method for managing communication in a user equipment having a plurality of subscriber identity modules (SIMs) may include receiving, from a first SIM among the plurality of SIMs, a request for an available network service for transferring data of the first SIM when a network service of the first SIM is unavailable; detecting availability of an in-device hotspot in response to the request, wherein the in-device hotspot is provided by a second SIM among the plurality of SIMs and is visible to the plurality of SIMs; and providing, to the first SIM, an access to the in-device hotspot for sending data to a network through a network service of the second SIM.

The data may include one or more of rich communication data, voice over long term evolution service data, and network application data.

The providing the access may include fetching a plurality of header parameters, a request template, session protocols, transaction protocols, and internet protocol details corresponding to the in-device hotspot from a database; and modifying a transport functionality, based on the plurality of header parameters, the request template, the session protocols, and the transaction protocols, for transferring the data through the network service of the second SIM.

The modifying may include adding a header field and a tunnel field to a header information based on the plurality of header parameters, the header field identifying the network associated with the first SIM and the tunnel field identifying a network associated with the second SIM.

The method may further include masking a network address based on the internet protocol details.

The method may further include detecting unavailability of the in-device hotspot in response to the request; detecting an availability of the network service provided by the second SIM from among the plurality of SIMs; activating the in-device hotspot through the second SIM; and providing to the first SIM the access to the in-device hotspot for transferring the data to the network.

The providing the access may include obtaining and adding a plurality of header parameters, a request template, session protocols, transaction protocols, and internet protocol details corresponding to the in-device hotspot to a database; and modifying a transport functionality based on the plurality of header parameters, the request template, the session protocols, and the transaction protocols, for transferring the data through the network service of the second SIM.

The method may further include selecting the second SIM from among the plurality of SIMs based on one or more of a predefined list and a user-input.

According to another aspect of the disclosure, a system for managing communication in a user equipment having a plurality of subscriber identity modules (SIM) may include at least one processor configured to: detect that a network service is unavailable to a first SIM among a plurality of SIMs and that a network service is available to a second SIM among the plurality of SIMs; detect an availability of an in-device hotspot; and provide, to the first SIM for sending data to a network, an access to the in-device hotspot for using the network service available to the second SIM.

The at least one processor may be further configured to: fetch a plurality of header parameters, a request template, session protocols, transaction protocols, and internet protocol details corresponding to the in-device hotspot from a database; and modify a transport functionality, based on the plurality of header parameters, the request template, the session protocols, and the transaction protocols, for transferring the data through the network service of the second SIM.

The data may include one or more of rich communication data, voice over long term evolution service data, and network application data.

The at least one processor may be further configured to add a header field and a tunnel field to a header information based on the plurality of header parameters, the header field identifying the network associated with the first SIM and the tunnel field identifying a network associated with the second SIM.

The at least one processor may be further configured to mask a network address based on the internet protocol details.

The at least one processor may be further configured to: detect unavailability of the in-device hotspot in response to the request; detect an availability of the network service provided by the second SIM from among the plurality of SIMs; activate the in-device hotspot through the second SIM; and provide to the first SIM the access to the in-device hotspot for transferring the data to the network.

The at least one processor may be further configured to: obtain and adding a plurality of header parameters, a request template, session protocols, transaction protocols, and internet protocol details corresponding to the in-device hotspot to a database; and modify a transport functionality based on the plurality of header parameters, the request template, the session protocols, and the transaction protocols, for transferring the data through the network service of the second SIM.

The at least one processor may be further configured to: add a header field and a tunnel field to a header information based on the plurality of header parameters, the header field identifying the network associated with the first SIM and the tunnel field identifying a network associated with the second SIM.

According to another aspect of the disclosure, a system for managing communication in a user equipment having a plurality of subscriber identity modules (SIMs) may include a receiver configured to receive a request for an available network service for transferring data of a first SIM from among the plurality of the SIMs when a network service of the first SIM is unavailable; and a detector communicatively coupled to the receiver to: detect availability of an in-device hotspot in response to the request, wherein the in-device hotspot is provided by a second SIM among the plurality of SIMs and is visible to the plurality of SIMs; and provide to the first SIM an access to the in-device hotspot for transferring the data to a network through a network service of the second SIM.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
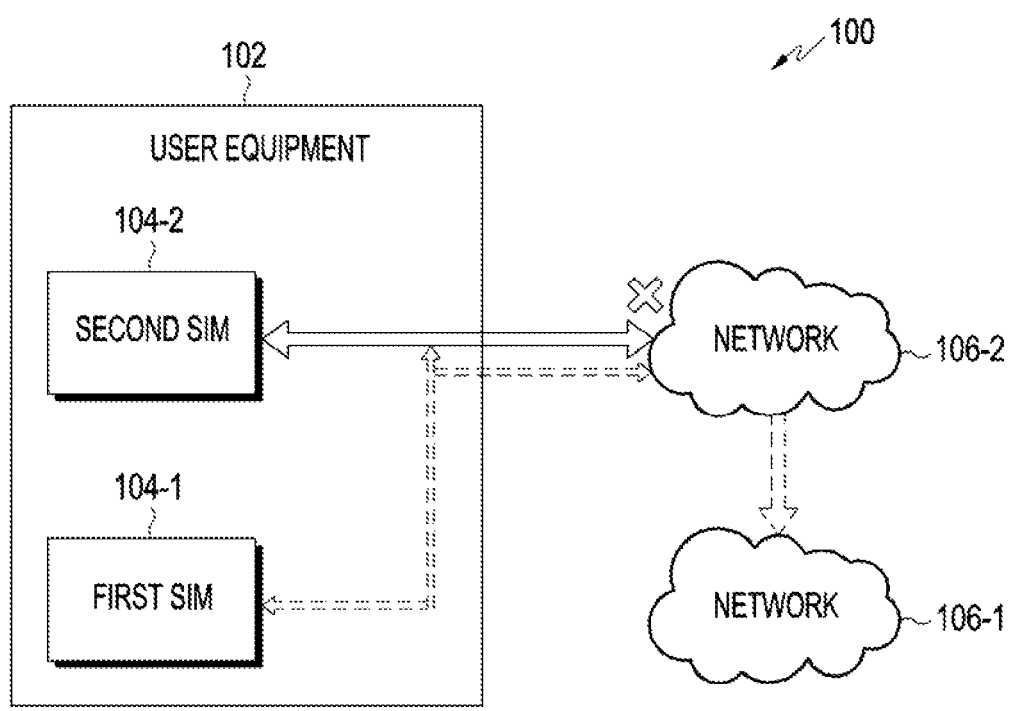
FIG. 1 shows a network environment depicting the interaction between a user equipment having a plurality of plurality of subscriber identity modules (SIM) with multiple networks of the related art.

For the purpose of promoting an understanding of the principles of the method and system, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the system as illustrated therein being contemplated as would normally occur to one skilled in the art to which the disclosure relates.

A skilled artisans will appreciate that elements in the drawings are illustrated for simplicity and may not have been necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments so as not to obscure the drawings with details that will be readily apparent to those of ordinary skill in the art having benefit of the description herein.

The foregoing general description and the following detailed description are explanatory of the present disclosure and are not intended to be restrictive thereof.

Reference throughout this specification to "an aspect", "another aspect" or similar language means that a particular feature, structure, or characteristic described in connection with the embodiment is included in at least one embodiment. Thus, appearances of the phrase "in an embodiment", "in another embodiment" and similar language throughout this specification may, but do not necessarily, all refer to the same embodiment.

The terms "comprises," "comprising", "includes," "including," or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" or "includes . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the relevant art. The system, methods, and examples provided herein are illustrative only and not intended to be limiting.

For the sake of clarity, the first digit of a reference numeral of each component of the present disclosure is indicative of the Figure number, in which the corresponding component is shown. For example, reference numerals starting with digit "1" are shown at least in FIG. 1. Similarly, reference numerals starting with digit "2" are shown at least in FIG. 2.

Embodiments of the present disclosure are described below in detail with reference to the accompanying drawings.

Figure 2:
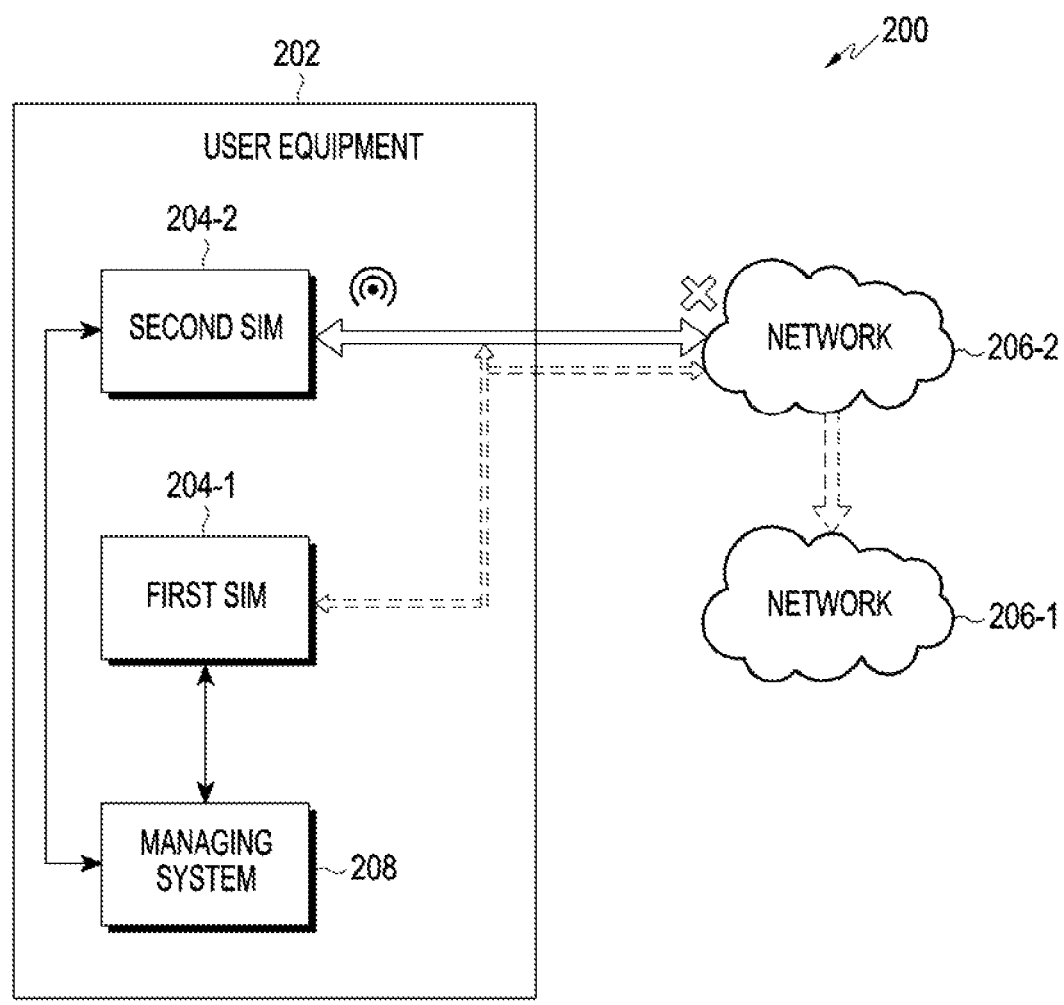
FIG. 2 shows a network environment depicting the interaction between a user equipment having a plurality of plurality of subscriber identity modules (SIM) with multiple networks, in accordance with an embodiment.

FIG. 2 shows an example network environment 200 for managing communications in user equipment 202 having a multiple or plurality of SIMs or user identities. The plurality of SIMs are capable of supporting various types of services such as RCS, VoLTE, etc. For the sake of brevity, only two SIMs, a first SIM 204-1 and a second SIM 204-2 are shown. The SIMs in the user equipment 202 may operate in the MSMS mode. Examples of the user equipment 202 include, but not limited to, mobile devices such as smartphones, personal digital assistants, smart watches, or any electronic device capable of supporting plurality of SIMs.

Further, each of the plurality of SIMs are capable of communicating with respective networks for transferring data through any of the wireless communication standards such as 3G, 4G, 5G, Wi-Fi or the like. The first SIM 204-1 is communicating with first network 206-1 and the second SIM 204-2 is communicating with second network 206-2. The first network 206-1 and the second network 206-2 may be different. The networks 206-1 and 206-2 can operate as dictated by the LTE standards as provided by the third generation partnership project (3GPP). The LTE standards are also referred to as the evolved universal terrestrial radio access (E-UTRA) standards. In other examples, the networks 206-1 and 206-2 may employ other types of cellular networks, such as second generation (2G) or third generation (3G) cellular networks, e.g., a global system for mobile (GSM) cellular network, an enhanced data rates for GSM evolution 25 (EDGE) cellular network, a universal terrestrial radio access network (UTRAN), a code division multiple access (CDMA) 2000 cellular network, and so forth. In further examples, cellular networks can be new generation radio (NR), a fifth generation (5G) or beyond cellular networks. Furthermore, in an example, the networks 206-1 and 206-2 may be a combination of one or more networks of the aforementioned type. Besides providing other capabilities to the user equipment 202, the networks 206-1 and 206-2 facilitate the UE 102 to connect to a packet data network (PDN), for example, Internet, Intranet, and IP multimedia subsystem (IMS). A connection with the PDN can be established using network service or data connectivity provided by any of the SIMS. In the embodiment of FIG. 2, a connection with the PDN can be established using network service or data connectivity provided by the second SIM 204-2 as default settings. The first network 206-1 may be implemented by a first mobile operator and the second network 206-2 may be implemented by a second network operator. The first network 206-1 and the second network 206-2 may connect with other networks such as RCS network providing and/or supporting RCS services, VoLTE network providing and/or supporting VoLTE services, etc.

In accordance with some example embodiments, the user equipment 202 includes managing system 208 for managing communications in the user equipment 202 having the plurality of SIMs. In some example embodiments, the managing system 208 detects that a network service is unavailable to a first SIM from a plurality of SIMs and is available to a second SIM from the plurality of SIMs. The managing system 208 detects availability of an in-device hotspot and provides to the first SIM an access to the in-device hotspot for using the network service available to the second SIM for sending data to a network.

In some example embodiments, the managing system 208 receives from a first SIM among the plurality of SIMs, a request for an available network service for transferring data of the first SIM when a network service of the first SIM is unavailable. The managing system 208 detects availability of an in-device hotspot in response to the request. The in-device hotspot is activated through a second SIM among the plurality of SIMs that is visible to the plurality of SIMs. The in-device hotspot provides a communication channel to transfer the data to the various networks. The first SIM and/or the second SIM among the plurality of SIMs can be configured/installed in the user equipment 200 in any order as selected by a user of the user equipment 200. The managing system 208 then provides the first SIM an access to the in-device hotspot for transferring the data to a network through a network service established by the second SIM. According to the embodiment of FIG. 2, the managing system 208 receives the request from the first SIM 204-1. The managing system 208 detects the in-device hotspot is available as provided by the second SIM 204-2. The managing system 208 then provides the access to the in-device hotspot to the first SIM 204-1 to transmit the data to the first network 206-1. As such, the second network 206-2 does not drop the data and transmits the data to the first network 206-1. Also, the first network 206-1 does not reject the data as received from the second network 206-2.

Figure 3:
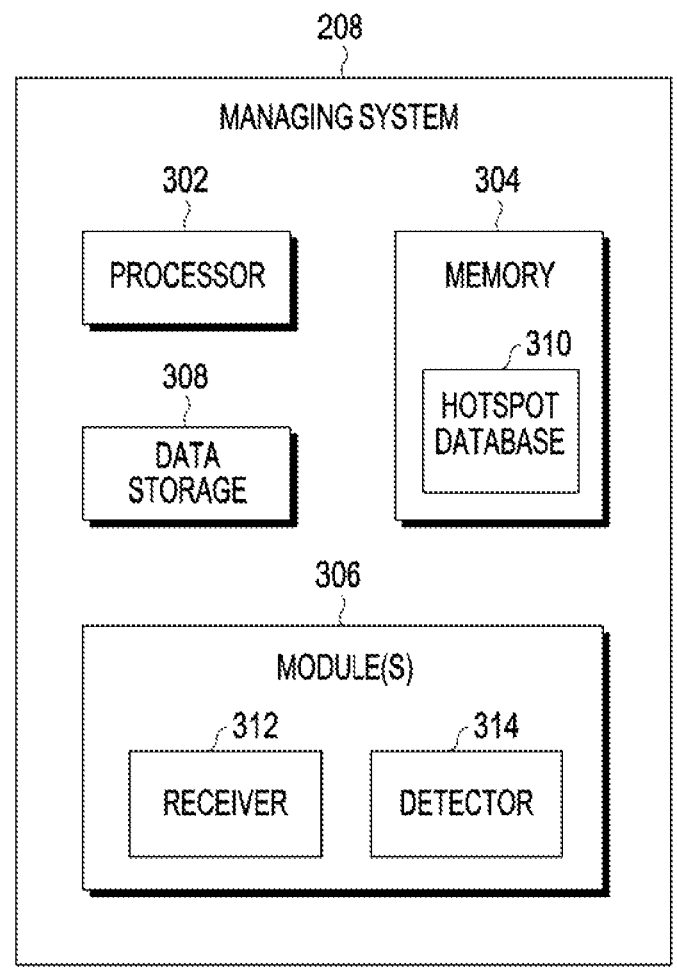
FIG. 3 shows a schematic block diagram of a system for managing the communications in accordance with an embodiment.
Figure 4:
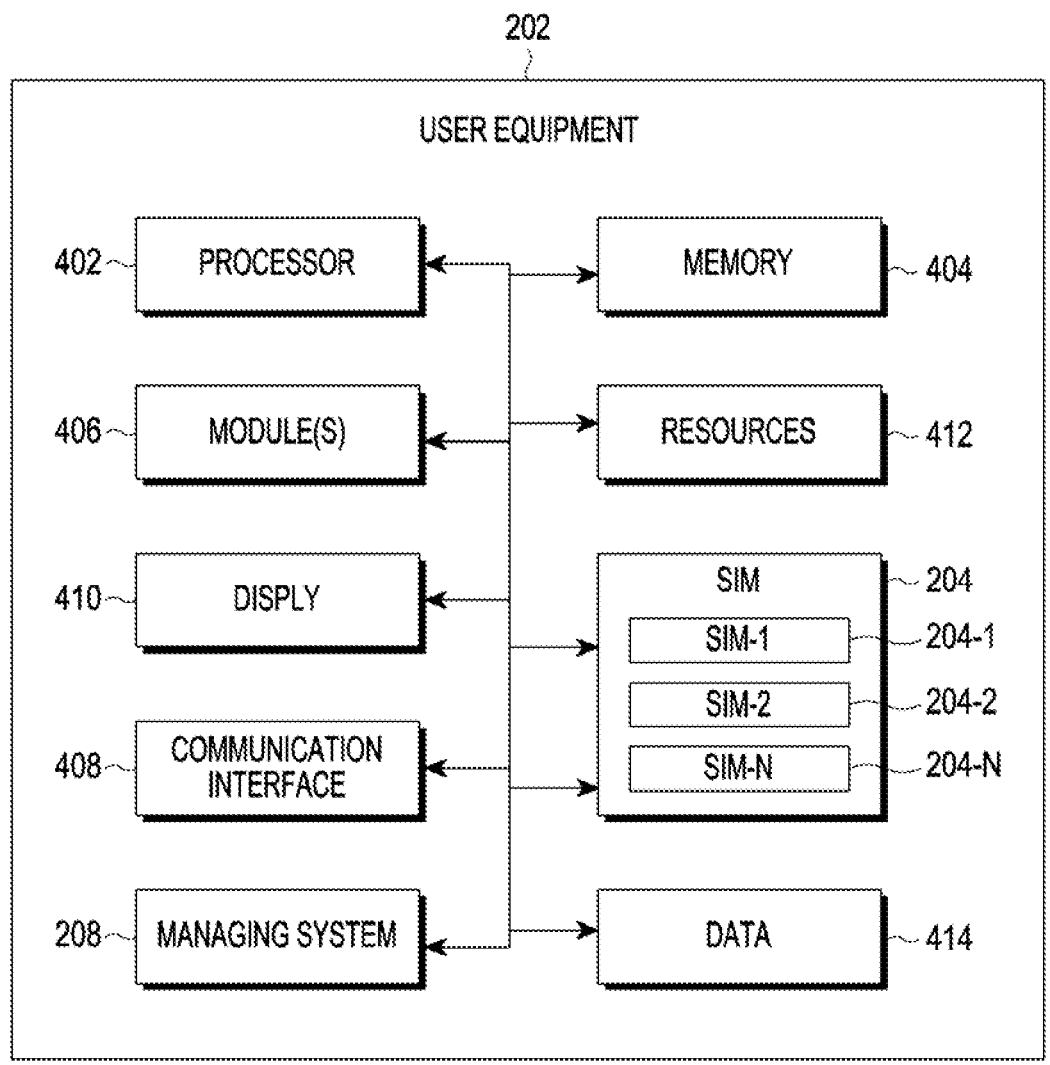
FIG. 4 shows a schematic block diagram of the user equipment comprising the system in accordance with an embodiment.

Constructional and operational details of the managing system 208 and the user equipment 202 are explained in detail in the description of FIG. 3 to FIG. 5. FIG. 3 shows a schematic block diagram of the managing system 208 for managing communications in the user equipment 202 according to an embodiment. In one example embodiment, the managing system 208 can be a chip incorporated in the user equipment 202. In another example embodiment, the managing system 208 may be implemented software. The managing system 208 may include a processor 302, a memory 304, module(s) 306, and data storage 308. The processor 302, the memory 304, and the module(s) 306 may be communicatively coupled to one another. The data storage 308 may serve, among other things, as a repository for storing data processed, received, and/or generated by the module(s) 306.

The processor 302 may be a single processing unit or a number of units, all of which could include multiple computing units. The processor 302 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 302 may be configured to fetch and/or execute computer-readable instructions and/or data stored in the memory 304.

The memory 304 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. The memory 304 may include a hotspot database 310. The hotspot database 310 can include configuration parameters of networks associated with the plurality of SIMs 204 and data related to in-device hotspot being created such as header parameters, request template, session protocols, transaction protocols, and internet protocol details. For example, the hotspot database 310 can include configuration parameters of the first network 206-1 associated with the first SIM 204-1 and the second network 206-2 associated with the second SIM 204-2.

The module(s) 306, among other things, may include routines, programs, objects, components, data structures, etc., which perform particular tasks or implement data types. The module(s) 306 may also be implemented as, signal processor(s), state machine(s), logic circuitries, and/or any other device or component that manipulate signals based on operational instructions.

Further, the module(s) 306 may be implemented in hardware, instructions executed by at least one processing unit, for example, processor 302, or by a combination thereof. The processing unit may be a general-purpose processor which executes instructions to cause the general-purpose processor to perform operations or, the processing unit may be dedicated to performing the required functions. According to an embodiment, the module(s) 306 may be machine-readable instructions (software) which, when executed by a processor/processing unit, may perform any of the described functionalities.

In some example embodiments, the module(s) 306 may be machine-readable instructions (software) which, when executed by a processor/processing unit, perform any of the described functionalities. In an example embodiment, the module(s) 306 may include a receiver 312 and a detector 314. The receiver 312 and the detector 314 are in communication with each other in one example embodiment.

FIG. 4 shows a schematic block diagram of the user equipment 202 having the plurality of SIMs 204-1, 204-2, . . . 204-N (hereinafter referred to as "SIMs 204" in plurality) according to an embodiment. Examples of the user equipment 202 include, but are not limited to, mobile devices such as smartphones, tablets. The user equipment 202 may include a plurality of applications that enable a user of the user equipment 202 to avail various services. Examples of the applications include, but not limited to, browsing application, chat application, media sharing application, streaming media application, social network application, video calling applications, voice calling application, email application, billing application etc.

The user equipment 202 may include at least one processor 402 (also referred to herein as "the processor 402"), a memory 404, module(s) 406, a communication interface 408, a display 410, resource(s) 412, data storage 414, and/or the managing system 208. The processor 402, the memory 404, the module(s) 406, the communication interface 408, the display 410, the resource(s) 412, and/or the managing system 208 may be communicatively coupled with each other via a bus (illustrated using directional arrows). The user equipment 202 may also include one or more input devices such as a microphone, a stylus, a number pad and/or any other device operative to interact with the user equipment 202. The user equipment 202 may also include one or more output devices such as speakers, etc. The data 414 may serve, among other things, as a repository for storing data processed, received, and/or generated by the module(s) 406.

The processor 402 may be a single processing unit or a number of units, all of which could include multiple computing units. The processor 402 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 402 may be configured to fetch and/or execute computer-readable instructions and/or data stored in the memory 404.

The memory 404 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes.

The module(s) 406, among other things, may include routines, programs, objects, components, data structures, etc., which perform particular tasks or implement data types. The module(s) 406 may also be implemented as, signal processor(s), state machine(s), logic circuitries, and/or any other device or component that manipulate signals based on operational instructions. The modules(s) 406 may include a Wi-Fi interface.

Further, the module(s) 406 may be implemented in hardware, instructions executed by at least one processing unit, for example, processor 402, or by a combination thereof. The processing unit may be a general-purpose processor which executes instructions to cause the general-purpose processor to perform operations or, the processing unit may be dedicated to performing the required functions. In another aspect of the present disclosure, the module(s) 406 may be machine-readable instructions (software) which, when executed by a processor/processing unit, may perform any of the described functionalities.

In some example embodiments, the module(s) 406 may be machine-readable instructions (software) which, when executed by a processor/processing unit, perform any of the described functionalities.

The communication interface 408 may enable (e.g., facilitate) communication by the user equipment 202. The display 410 may display various types of information (for example, media contents, multimedia data, text data, etc.) to a user of the user equipment 202. The display 410 may include, but is not limited to, a liquid crystal display (LCD), a light-emitting diode (LED) display, an organic LED (OLED) display, a plasma cell display, an electronic ink array display, an electronic paper display, a flexible LCD, a flexible electrochromic display, and/or a flexible electrowetting display.

The resource(s) 412 may be physical and/or virtual components of the user equipment 202 that provide inherent capabilities and/or contribute towards the performance of the user equipment 202. Examples of the resource(s) 412 may include, but are not limited to, a memory (e.g., the memory 404), a power source (e.g. a battery), a display (e.g., the display 410), etc. The resource(s) 412 may include a power sources/batteries, a network interface (e.g., the communication interface 408), etc., in addition to the processor 402, the memory 404, and the display 410.

The managing system 208 may be incorporated in the user equipment 202. In one example embodiment, the managing system 208 can be a chip incorporated in the user equipment 202. In one example embodiment, the managing system 208 may be part of the processor 302. In another example embodiment, the managing system 208 can be software such as part of the module(s) 406. According to some example embodiments, operations described herein as being performed by any or all of the managing system 208, the receiver 312, the detector 314, the module(s) may be performed by at least one processor (e.g., the processor 302) executing program code that includes instructions (e.g., the module(s) 306 and/or the module(s) 406) corresponding to the operations. The instructions may be stored in a memory (e.g., the memory 304 and/or the memory 404).

Typically, a first SIM from the plurality of SIMs searches for a network service to transmit data when a network service of the first SIM is unavailable. The data includes one or more of RCS data, VoLTE service data, and network application data. To this end, the first SIM sends a request to any of an operating system, the processor 402, etc., as known in the art. In accordance with some of the embodiments, the receiver 312 receives the request from the first SIM. Referring to FIG. 2, the receiver 312 receives the request for network service from the first SIM 204-1. The receiver 312 may employ techniques as known in the art to receive the request. In accordance with some of the embodiments, the detector 314 detects a network service is unavailable to a first SIM from a plurality of SIMs and is available to a second SIM from the plurality of SIMs. Referring to FIG. 2, the detector 314 detects the network service is unavailable to the first SIM 204-1 and the network service is available to the second SIM 204-2 using techniques as known in the art.

In response to the received request, the detector 314 detects an availability of an in-device hotspot. The in-device hotspot is a local hotspot established or configured to provide data connectivity from one SIM to the other SIMs and is only visible to the SIMs 204 in the user equipment 202. Thus, usage of the local hotspot by other applications, such as email application, browsing application, streaming media application, etc., in the user equipment 202 or other devices connected with the user equipment 202 is averted. As such, the in-device hotspot can be a hidden network, which doesn't broadcast network details such as service set identifier (SSID), MAC address, IP address, etc. The in-device hotspot provides the SIMs 204 a communication channel to transfer the data to corresponding networks when the network service is not available for themselves. The in-device hotspot may be a local hotspot established using network service of the second SIM. According to an embodiment, the in-device hotspot is a local hotspot established using network service of the second SIM using techniques as known in the art. Referring to FIG. 2, the in-device hotspot may be configured by the network service of the second SIM 204-2. A plurality of header parameters, a request template, session protocols, transaction protocols, and internet protocol (IP) details such as IP table, port details, etc., may be stored in the hotspot database 310 when the in-device hotspot is configured. According to an embodiment detector 314 may detect the availability of the in-device hotspot by checking the details of the in-device hotspot from the hotspot database 310. According to another embodiment, the detector 314 may detect the availability of the in-device hotspot by intercepting data packets sent through the in-device hotspot using techniques as known in the art.

Upon detecting the availability of the in-device hotspot, the detector 314 provides access of the in-device hotspot to the first SIM and establishes a non-radio flow/connection (e.g., Wi-Fi flow) in relation thereto. Referring to FIG. 2, the detector 314 provides access of the in-device hotspot to the first SIM 204-1. According to an embodiment, the detector 314 provides the access by connecting the first SIM 204-1 with the in-device hotspot through the non-radio flow using techniques as known in the art.

According to an embodiment, to provide access to the in-device hotspot, the detector 314 fetches a plurality of header parameters, a request template, session protocols, transaction protocols, and interne protocol (IP) details corresponding to the in-device hotspot from the database 310. The plurality of headers, the request template, the session protocols, the transaction protocols, and the IP details are capable of providing security to the data when the data is transferred from the SIM using the in-device hotspot. The plurality of header parameters includes details of network for whom request is going, i.e., details of recipient network, and details of network on which request is going, i.e., details of sender network. When the data is transferred, the headers are processed to confirm the address of the recipient. When the data is received, the headers are processed to confirm the address of the sender. The network details include SSID of the first network 206-1, SSID of the second network 206-2, MAC address of the UE, IP address of first network 206-1, IP address of second network 206-2, SIM details of the first SIM 204-1, SIM details of the second SIM 204-2, etc. The session protocols can use secure protocols such as HTTP to HTTPs, MSRP to MSRPS, TCP to TLS, and SIP to SIPS. The transaction protocols can use secure protocols such as HTTP to HTTPs, MSRP to MSRPS, TCP to TLS, and SIP to SIPS. The request template can indicate request is sent over non-3GPP access, use of IPSec tunnel for SIP Digest Authentication and TLS, and use of signal security method. The IP details can include IP Table and Port details for masking.

According to an embodiment, the detector 314 then modifies transport functionality based on the plurality of header parameters, the request template, the session protocols, and the transaction protocols, for transferring the data of the SIM through the in-device hotspot. As would be understood, the transport functionality is implemented by TCP/IP stack in a user equipment (UE) to enable transport or transmission of packets over the networks. The detector 314 may also mask network address based on the IP details. The masking of the network address can be performed using techniques as known in the art. Referring to FIG. 2, the detector 314 may modify the transport functionality based on the plurality of header parameters, the request template, the session protocols, the transaction protocols, and the IP details. As such, the detector 314 may modify the transport functionality based on the plurality of headers, the request template, the session protocols, and the transaction protocols so as to enable transfer of data through the in-device hotspot, the first network 206-1, and the PDN to the second network 206-2. To this end, the detector 314 adds new header fields to header information for packets containing the data. The new header fields include a home header field and tunnel header field. The home header field identifies the network associated with the first SIM requesting the network service, i.e., recipient network details. The tunnel header field identifies the network associated with the second SIM providing the network service through the in-device hotspot, i.e., sender network details. Thus, the packets or data is not dropped due to the addition of the new header fields. In addition, the new header fields help operators of the sender network and the recipient network to reconfirm the arriving packets and to plan for any billing updates.

According to an embodiment, the detector 314 determines the first SIM 204-1 may use the SIP protocol and updates header information for packets containing the data with new header fields. A home header field indicating recipient network details as network details of the first network 206-1 and the SIM details of first SIM 204-1 is added to the header information. A tunnel header field indicating sender network details as network details of the second network 206-2 and the SIM details of second SIM 204-2 is added to the header information. After the first SIM 204-1 connects to the in-device hotspot, the data is transmitted using the flow established and modified transport functionality. To this end, upon modifying the functionality, the detector 314 sends a configuration request, for example, Auto Configuration Service (ACS) request to the first network 204-1. The first network 204-1 is able to successfully identify/verify the identity of the requester, i.e., the SIM 204-1 based on the new header fields, i.e., the home header field and the tunnel header field, added in the header information. The first network 204-1 validates the SIM 204-1 based on the SIM details such as IMSI or MSISDN provided by the user of the UE 202 and an one-time password (OTP) as known in the art. Upon successful validation, the first network 204-1 provisions the user and sends a valid configuration to the UE 202 as known in the art. After configuration, SIP registration is performed as known in the art. The SIP request will be sent on IPSEC tunnel using Authentication and Key Agreement (AKA) flow for mutual AKA based authentication using the details of the first SIM 204-1. Thereafter, secure protocols shall be used for sending the data. According to an embodiment, data will be sent on MSRPS protocol instead of MSRP protocol. According to another embodiment, data will be sent on HTTPS protocol instead of HTTP protocol.

Thus, as the data of the first SIM 204-1 relates to the non-trusted flow, i.e., the hotspot flow, the second network 206-2 would not drop the data of the first SIM 204-1. Upon receiving the aforementioned traffic, the second network 206-2 then forwards the same to the first network 206-1 through the PDN. Thus, in addition to the data of the second SIM 204-2, the user equipment 202 is able to transmit the data of the first SIM 204-1.

According to an embodiment, the detector 314 detects un-availability of the in-device hotspot. As such, the detector 314 detects an availability of network service provided by the second SIM from among the plurality of SIMs 204. The network service provided by the second SIM can be one of a 5G network service and free network service. The detector 314 detects the availability of the network service based on SIM details of the second SIM. Referring to FIG. 2, in one example, the in-device hotspot is not available. As such, the detector 314 detects the availability of the network service on the second SIM 204-2 based on SIM details of the second SIM 204-2. The SIM details can be obtained from a memory of SIM, as known in the art. In one example embodiment, the detector 314 selects the second SIM from among the plurality of SIMs based on a predefined list. The predefined list indicates which SIM can be used for creation of the in-device hotspot. Such a list can be predefined during manufacturing of the user equipment 202 or can be defined by the user while using the user equipment 202. Upon selecting the SIM from the predefined list, the detector 314 obtains SIM details stored in the SIM and detects the availability of the network service from SIM details. In one example embodiment, the detector 314 selects the second SIM based a user-input. In such example, the detector 314 provides a notification indicative of using the SIMs for in-device hotspot on the display 410 and receives a user-input indicative of selecting the SIM. Upon selecting the SIM, the detector 314 detects the availability of the network service from the SIM details. Thus, the detector 314 selects the second SIM capable of providing one of 5G network service and a free network service.

The detector 314 then activates the in-device hotspot through the second SIM. The in-device hotspot is a local hotspot established using network service of the second SIM. According to an embodiment, the in-device hotspot is a local hotspot established using network service of the SIM using techniques as known in the art. Referring to FIG. 2, when the in-device hotspot is not available, the detector 314 configures the in-device hotspot by using the network service of the second SIM 204-2. The detector 314 provides to the first SIM 204-1 an access to the in-device hotspot for transferring the data to the first network 206-1 in a manner as described above.

According to an embodiment, to provide the access, the detector 314 obtains and adds a plurality of header parameters, a request template, session protocols, transaction protocols, and IP details corresponding to the in-device hotspot or the second SIM in the database 310. As described earlier, the plurality of header parameters includes details of network for whom request is going, i.e., details of recipient network, and details of network on which request is going, i.e., details of sender network. The session protocols can use secure protocols such as HTTP to HTTP, MSRP to MSRPS, TCP to TLS, SIP to SIPS. The transaction protocols can use secure protocols such as HTTP to HTTPs, MSRP to MSRPS, TCP to TLS, SIP to SIPS. The request template can indicate request is sent over non-3GPP access, use of IPSec tunnel for SIP Digest Authentication and TLS, and use of signal security method. The IP details can include IP Table and Port details for masking. Referring to FIG. 2, the detector 314 obtains the plurality of header parameters, the request template, the session protocols, the transaction protocols, and the IP details from the SIMs and the networks associated with the SIM. The detector 314 then adds the plurality of header parameters, the request template, the session protocols, the transaction protocols, and the IP details in the database 310 after activation of the in-device hotspot. The plurality of headers include SSID of the first network 206-1, SSID of the second network 206-2, MAC address of the UE, IP address of first network 206-1, IP address of second network 206-2, SIM details of the SIM 204-1, SIM details of the SIM 204-2, etc. The detector 314 then modifies transport functionality based on the plurality of header parameters, the request template, the session protocols, and the transaction protocols, for transferring the data of the SIM 204-2 through the in-device hotspot, as described earlier. To this end, the detector 314 adds the new header fields to the header information of the packets containing the data, as described earlier. The detector 314 may mask network address based on the IP details. The masking may be performed using techniques as known in the art. The detector 314 then enables transferring the data based on the modified transport functionality as described above.

Figure 5A:
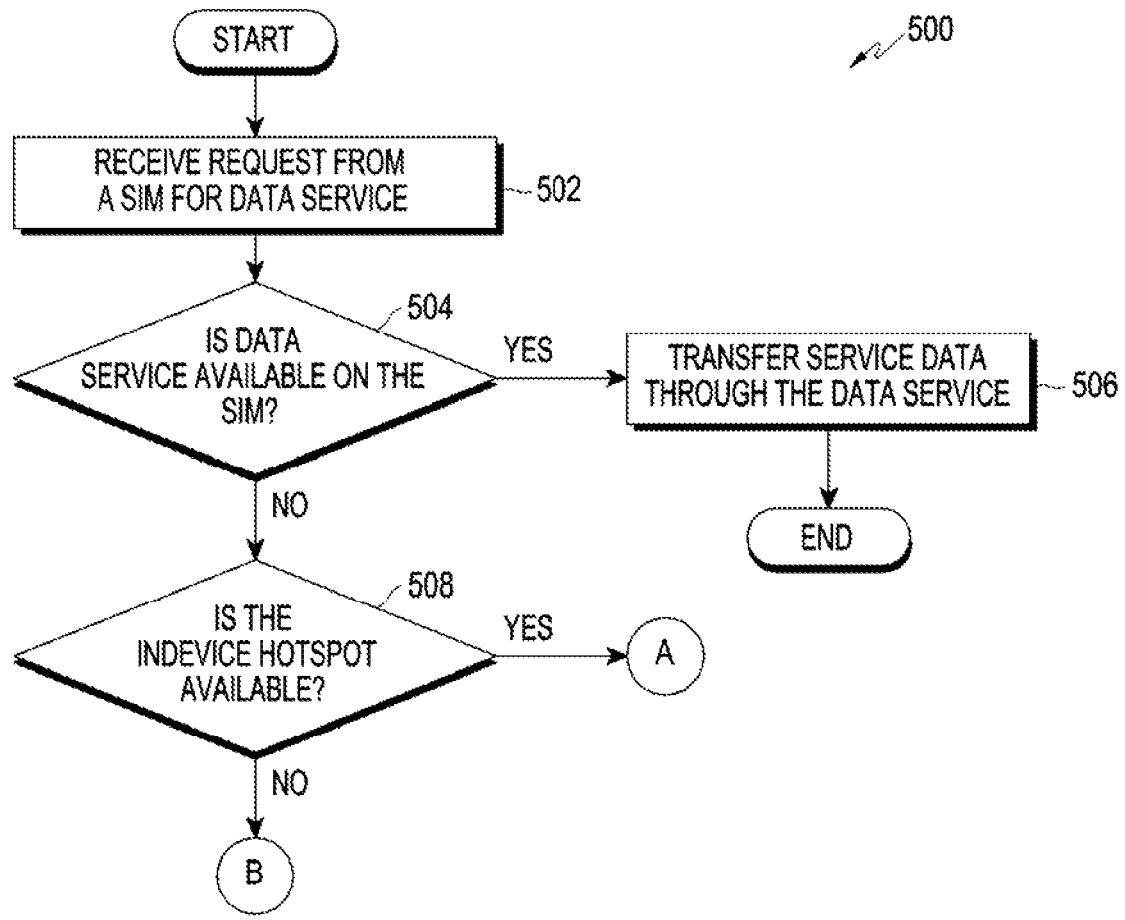
FIG. 5A, FIG. 5B and FIG. 5C show an example process for managing the communications flow in accordance with an embodiment.
Figure 5B:
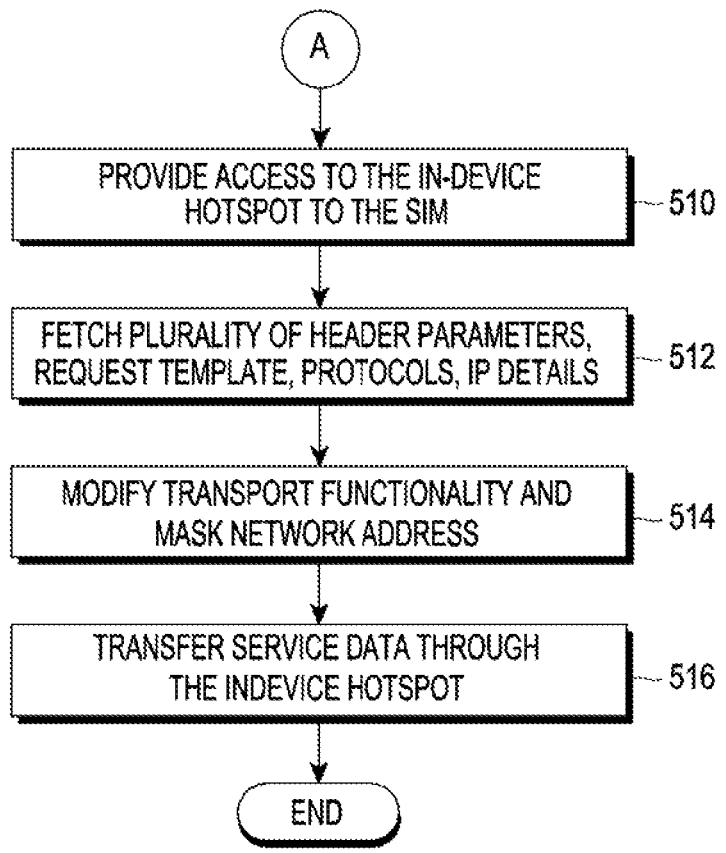
Figure 5C:
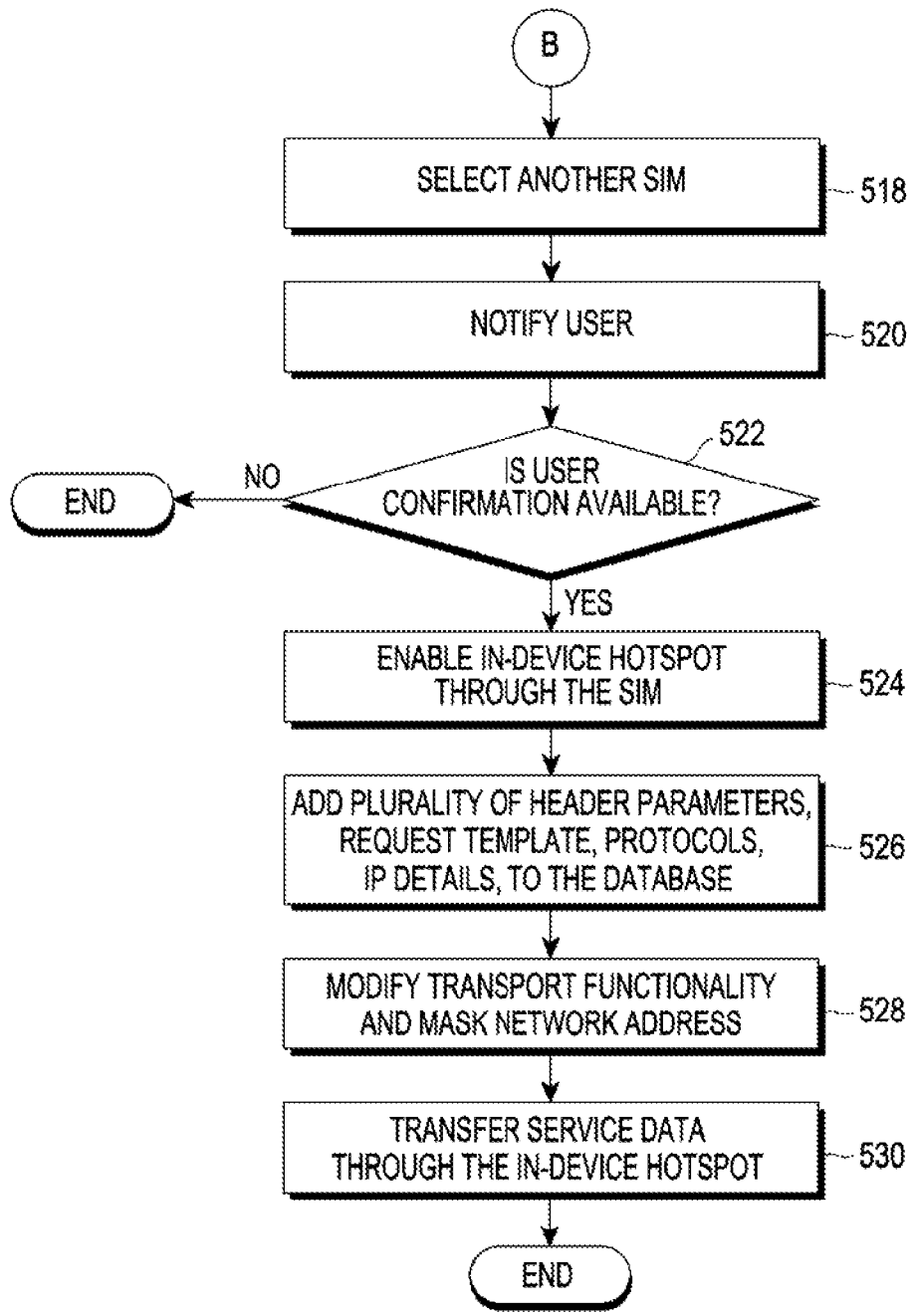

FIG. 5A to FIG. 5C show an example process for managing the communications in accordance with some example embodiments. In an example embodiment, the first SIM 204-1 is transmitting RCS data as the data to the first network 206-1 using the in-device hotspot provided by the second SIM 204-2.

At step 502, the receiver 312 receives a request from the first SIM 204-1 for the network service to transfer RCS data. At step 504, the detector 314 detects if network service is available on the first SIM 204-1. If at step 504, the network service is available, the process flows to step 506. At step 506, the first SIM 204-1 transfer the RCS data using the network service, and thereafter the process ends. If at step 504, the network service on first SIM 204-1 is unavailable, the process flows to step 508.

At step 508, the detector 314 detects availability of the in-device hotspot activated through the second SIM 204-2. If at step 508, the in-device hotspot is available, the process flows to step 510 as indicated in FIG. 5B, represented by A. Referring to FIG. 5B, at step 510, the detector 314 provides access to the in-device hotspot to the first SIM 204-1. To this end, at step 512, the detector 314 fetches the plurality of header parameters, the request template, the session protocols, the transaction protocols, and the IP details corresponding to the in-device hotspot from the database 310. At step 514, the detector 314 modifies the transport functionality based on the plurality of header parameters, the request template, the session protocols, the transaction protocols for transferring the data through the network service established by the second SIM 204-2 to the first SIM 204-1. As such, the detector 314 adds the header field and the tunnel field to the header information of packets containing the data. The detector 314 may also mask the network address. At step 516, the first SIM 204-1 transfers the RCS data through the in-device hotspot, and thereafter the process ends.

If at step 508, the in-device hotspot activated through the second SIM is unavailable, the process flows to step 518 as indicated in FIG. 5C, represented by B. Referring to FIG. 5B, at step 518, the detector 314 selects another SIM, for example, second SIM 204-2, having either 5G network service or free network service. At step 520, the detector 314 provides a notification indicating selection second SIM 204-2 or the SIMs 204 for in-device hotspot to the user. At step 522, the detector 314 detects if the user confirmation for selection of the second SIM 204-2 is available. If at step 522, the user confirmation is not available, the process ends. If at step 522, the user confirmation is available, the process flows to step 524.

At step 524, the detector 314 enables the in-device hotspot through the second SIM 204-2. At step 526, the detector 314 adds the plurality of header parameters, request template, the session protocols, the transaction protocols, and the IP details to the database 310. At step 528, the detector 314 modifies transport functionality based on the plurality of header parameters, request template, the session protocols, and the transaction protocols. As such, the detector 314 adds the header field and the tunnel field to the header information of packets containing the data. The detector 314 may also mask the network address. At step 530, the first SIM 204-1 transfers the RCS data through the in-device hotspot, and thereafter the process ends.

Thus, the present disclosure enables the RCS service for all the SIMs of a multi SIM UE, irrespective of user data setting and device hardware constraints, and still maintaining the user RCS setting request. Furthermore, the present disclosure provides the RCS services with no properties flow towards the network servers, and implements aspects at Client's side. Furthermore, the present disclosure provides for supporting the RCS services on existing and new technologies. For example, the RCS services are supported on Fastest Channel 5G in early stage of Voice over New Radio (VONR) for all the SIMs of the UE.

Thus, as claimed in aforementioned aspects, multiple RCS will be available on all SIMs irrespective of data setting. Furthermore, no extension is required in modem or access point to support multiple RCS over DEFAULT PDN. Furthermore, resource optimization, for example, battery saving is achieved by avoiding modem operation to keep both operator channels active. Furthermore, relative disconnection of ongoing session is reduced. Although, the above example is based on transmitting RCS data when SIMs operate in the MSMS mode, the disclosure is not limited to transmitting RCS data. Through the present disclosure, any type of data can be transmitted securely by other SIMs using the network service available on one SIM with additional headers and flow. This leads to optimal utilization of resources of the user equipment and the networks.

Figure 6:
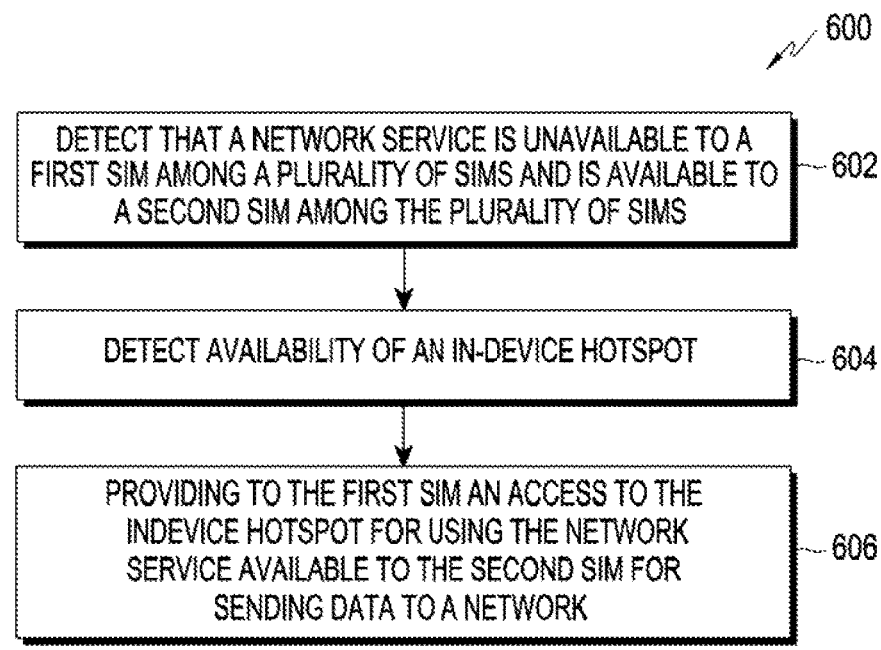
FIG. 6 shows a flow diagram of a method for managing the communications, in accordance with an embodiment.

FIG. 6 shows a flow diagram for a method 600 for managing communication in user equipment with a plurality of subscriber identity modules (SIM), in accordance with an embodiment. The method 600 may be implemented by the managing system 208 using components thereof and/or the processor 302 in the user equipment 202, as described above. In an embodiment, the method 600 may be executed by the receiver 312 and the detector 314. Further, for the sake of brevity, details that are explained in details in the description of FIG. 2 through FIG. 5A-5C are not explained in detail in the description of FIG. 6.

At block 602, the method 600 includes detecting that a network service is unavailable to a first SIM among a plurality of SIMs and is available to a second SIM among the plurality of SIMs. For example, the detector 314 detects the network service is unavailable to the first SIM 204-1 and the network service is available to the second SIM 204-2.

At block 604, the method 600 includes detecting availability of an in-device hotspot. The in-device hotspot is generated by the second SIM and is visible to the plurality of SIMs. For example, the detector 314 detects availability of the in-device hotspot.

At block 606, the method 600 includes providing to the first SIM an access to the in device hotspot for using the network service available to the second SIM for sending data to a network. For example, the detector 314 provides access of the in-device hotspot to the first SIM 204-1 for using the network service available to the second SIM 204-2 for sending data to the first network 206-1.

Further, in some embodiment, the method 600 includes fetching a plurality of header parameters, a request template, session protocols, transaction protocols, and internet protocol details corresponding to the in-device hotspot from a database. The method 600 includes modifying a transport functionality based on the plurality of header parameters, the request template, the session protocols, and the transaction protocols, for sending the data using the network service available to the second SIM. To this end, the method 600 may include adding a header field and a tunnel field to a header information based on the plurality of header parameters, the header field identifying the network associated with the first SIM and the tunnel field identifying a network associated with the second SIM. The method 600 may also include masking a network address based on the interne protocol details.

Further, in some embodiments, the method 600 includes detecting unavailability of the in-device hotspot. The method 600 may include selecting the second SIM from among the plurality of SIMs. The method 600 may include activating the in-device hotspot through the network service of the second SIM. The method 600 may include providing to the first SIM an access to the in-device hotspot for sending the data using the network service available to the second SIM.

According to an embodiment, the method 600 includes obtaining and adding a plurality of header parameters, a request template, session protocols, transaction protocols, and internet protocol details corresponding to the in-device hotspot to a database. The method 600 may include modifying a transport functionality based on the plurality of header parameters, the request template, the session protocols, and the transaction protocols, for sending the data using the network service available to the second SIM. To this end, the method 600 may include adding a header field and a tunnel field to a header information based on the plurality of header parameters, the header field identifying the network associated with the first SIM and the tunnel field identifying a network associated with the second SIM. The method 600 may also include masking a network address based on the internet protocol details. The method 600 also includes selecting the second SIM from among the plurality of SIMs based on one or more of predefined list and a user-input.

Figure 7:
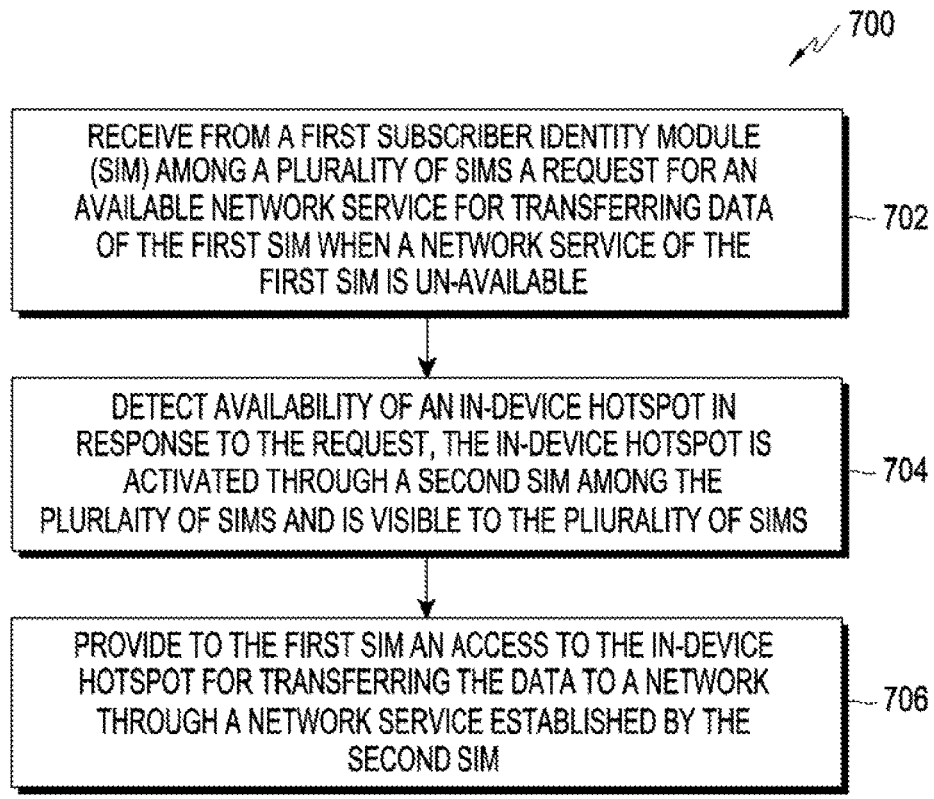
FIG. 7 shows flow diagram of a method for managing the communications, in accordance with an embodiment.

FIG. 7 shows a flow diagram for a method 700 for managing communication in user equipment with a plurality of subscriber identity modules (SIM), in accordance with an embodiment. The method 700 may be implemented by the managing system 208 using components thereof and/or the processor 302 in the user equipment 202, as described above. According to an embodiment, the method 700 may be executed by the receiver 312 and the detector 314. Further, for the sake of brevity, details that are explained in details in the description of FIG. 2 to FIG. 5A-5C are not explained in detail in the description of FIG. 7.

At block 702, the method 700 includes receiving, from a first SIM among the plurality of SIMs, a request for an available network service for transferring data of the first SIM when a network service of the first SIM is unavailable. The data includes one or more of rich communication data, VoLTE data, and network application data. For example, the receiver 312 receives the request from the first SIM 204-1.

At block 704, the method 700 includes detecting availability of an in-device hotspot in response to the request, wherein the in-device hotspot is activated through a second SIM among the plurality of SIMs and is visible to the plurality of SIMs. For example, the detector 314 detects the availability of the in-device hotspot activated through the second SIM 204-2.

At block 706, the method 700 includes providing to the first SIM an access to the in-device hotspot for transferring the data to a network through a network service established by the second SIM. For example, the detector 314 provides access of the in-device hotspot to the first SIM 204-1.

According to an embodiment, to provide the access, the method 700 includes fetching a plurality of header parameters, request template, session protocols, transaction protocols, and interne protocol details corresponding to the in-device hotspot from a database. The method 700 may include modifying transport functionality based on one or more of the plurality of header parameters, the request template, the session protocols, and the transaction protocols, for transferring the data through the network service established by the second SIM. As such, the method 700 may include adding a header field and a tunnel field to a header information based on the plurality of header parameters. The header field identifies the network associated with the first SIM. The tunnel field identifies a network associated with the second SIM. The method 700 may also include masking a network address based on the IP details.

Further, according to an embodiment, the method 700 includes detecting unavailability of the in-device hotspot in response to the request. The method 700 may include detecting an availability of network service provided by the second SIM from amongst the plurality of SIMs, the network service being one of 5G network service and free network service. The method 700 may include activating the in-device hotspot through the second SIM. The method 700 may include providing to the first SIM an access to the in-device hotspot for transferring the data to the network.

According to an embodiment, to provide the access, the method 700 includes adding a plurality of header parameters request template, session protocols, transaction protocols, and internet protocol details corresponding to the in-device hotspot to a database. The method 700 may include modifying the transport functionality based on the plurality of header parameters request template, session protocols, transaction protocols, and internet protocol details for transferring the data through the network service established by the second SIM. As such, the method 700 may include adding a header field and a tunnel field to a header information based on the plurality of header parameters. The header field identifies the network associated with the first SIM. The tunnel field identifies a network associated with the second SIM. The method 700 may also include masking a network address based on the IP details.

According to an embodiment, the method 700 includes selecting the second SIM from amongst the plurality of SIMs based on one or more of a predefined list and a user-input.

Thus, the present methods enable managing communication in the user equipment having a plurality of SIMs by enabling one SIM to access hotspot provided by another SIM for transmitting of data when a network service of the SIM is not available. This enables availability of data for all SIMs irrespective of data settings and reduces power consumption, which leads to enhanced user-experience.

While specific language has been used to in the description, any limitations arising on account thereto, are not intended. As would be apparent to a person in the art, various working modifications may be made to the method in order to implement the inventive concepts as taught herein. The drawings and the foregoing description give examples of embodiments. Those skilled in the art will appreciate that the described elements may well be combined into a single functional element. Alternatively, certain elements may be split into multiple functional elements. Elements from one embodiment may be added to another embodiment. Clearly, the present disclosure may be otherwise variously embodied, and practiced within the scope of the following claims.

The invention claimed is:

1. A method for managing communication in a user equipment including a plurality of subscriber identity modules (SIMs), the method comprising:
   detecting that a first network service associated with a first network is unavailable to a first SIM among the plurality of SIMS and a second network service associated with a second network is available to a second SIM among the plurality of SIMS;
   detecting an availability of an in-device hotspot; and
   providing, to the first SIM for sending data to the first network, an access to the in-device hotspot for using the second network service available to the second SIM.

2. A method for managing communication in a user equipment including a plurality of subscriber identity modules (SIMs), the method comprising:
   receiving, from a first SIM among the plurality of SIMs, a request for an available first network service associated with a first network for transferring data of the first SIM when the first network service of the first SIM is unavailable;
   detecting availability of an in-device hotspot in response to the request, wherein the in-device hotspot is provided by a second SIM among the plurality of SIMS and is visible to the plurality of SIMS; and
   providing, to the first SIM, an access to the in-device hotspot for sending data to the first network through a second network service associated with a second network of the second SIM.

3. The method as claimed in claim 2, wherein the data includes one or more of rich communication data, voice over long term evolution service data, and network application data.

4. The method as claimed in claim 2, wherein the providing the access comprises:
   fetching a plurality of header parameters, a request template, session protocols, transaction protocols, and internet protocol details corresponding to the in-device hotspot from a database; and
   modifying a transport functionality, based on the plurality of header parameters, the request template, the session protocols, and the transaction protocols, for transferring the data through the second network service of the second SIM.

5. The method as claimed in claim 4, wherein the modifying comprises:
   adding a header field and a tunnel field to a header information based on the plurality of header parameters, the header field identifying the first network associated with the first SIM and the tunnel field identifying the second network associated with the second SIM.

6. The method as claimed in claim 4, further comprises:
   masking a network address based on the internet protocol details.

7. The method as claimed in claim 2, further comprising:
   detecting unavailability of the in-device hotspot in response to the request;
   detecting an availability of the second network service provided by the second SIM from among the plurality of SIMS;
   activating the in-device hotspot through the second SIM; and
   providing to the first SIM the access to the in-device hotspot for transferring the data to the first network.

8. The method as claimed in claim 7, wherein the providing the access comprises:
obtaining and adding a plurality of header parameters, a request template, session protocols, transaction protocols, and internet protocol details corresponding to the in-device hotspot to a database; and
modifying a transport functionality based on the plurality of header parameters, the request template, the session protocols, and the transaction protocols, for transferring the data through the second network service of the second SIM.

9. The method as claimed in claim 8, wherein the modifying comprises:
adding a header field and a tunnel field to a header information based on the plurality of header parameters, the header field identifying the first network associated with the first SIM and the tunnel field identifying the second network associated with the second SIM.

10. The method as claimed in claim 8, further comprises:
masking a network address based on the internet protocol details.

11. The method as claimed in claim 7, further comprising:
selecting the second SIM from among the plurality of SIMS based on one or more of a predefined list and a user-input.

12. A user equipment having a plurality of subscriber identity modules (SIMs), the user equipment comprising:
at least one processor configured to:
detect that a first network service associated with a first network is unavailable to a first SIM among a plurality of SIMS and that a second network service associated with a second network is available to a second SIM among the plurality of SIMS;
detect an availability of an in-device hotspot; and
provide, to the first SIM for sending data to the first network, an access to the in-device hotspot for using the second network service available to the second SIM.

13. The user equipment as claimed in claim 12, wherein the at least one processor is further configured to:
fetch a plurality of header parameters, a request template, session protocols, transaction protocols, and internet protocol details corresponding to the in-device hotspot from a database; and
modify a transport functionality, based on the plurality of header parameters, the request template, the session protocols, and the transaction protocols, for transferring the data through the second network service of the second SIM.

14. The user equipment as claimed in claim 13, wherein the data includes one or more of rich communication data, voice over long term evolution service data, and network application data.

15. The user equipment as claimed in claim 14, wherein the at least one processor is further configured to:
add a header field and a tunnel field to a header information based on the plurality of header parameters, the header field identifying the first network associated with the first SIM and the tunnel field identifying the second network associated with the second SIM.

16. The user equipment as claimed in claim 13, wherein the at least one processor is further configured to mask a network address based on the internet protocol details.

17. The user equipment as claimed in claim 12, wherein the at least one processor is further configured to:
detect unavailability of the in-device hotspot in response to a request for an available network service for transferring data of the first SIM when the first network service of the first SIM is unavailable;
detect an availability of the second network service provided by the second SIM from among the plurality of SIMS;
activate the in-device hotspot through the second SIM; and
provide to the first SIM the access to the in-device hotspot for transferring the data to the first network.

18. The user equipment as claimed in claim 17, wherein the at least one processor is further configured to:
obtain and adding a plurality of header parameters, a request template, session protocols, transaction protocols, and internet protocol details corresponding to the in-device hotspot to a database; and
modify a transport functionality based on the plurality of header parameters, the request template, the session protocols, and the transaction protocols, for transferring the data through the second network service of the second SIM.

19. The user equipment as claimed in claim 18, wherein the at least one processor is further configured to: add a header field and a tunnel field to a header information based on the plurality of header parameters, the header field identifying the first network associated with the first SIM and the tunnel field identifying the second network associated with the second SIM.

20. A user equipment including a plurality of subscriber identity modules (SIMs), the user equipment comprising:
a receiver configured to receive a request for an available network service for transferring data of a first SIM from among the plurality of SIMs when a first network service associated with a first network of the first SIM is unavailable; and
a detector communicatively coupled to the receiver and configured to:
detect availability of an in-device hotspot in response to the request, wherein the in-device hotspot is provided by a second SIM among the plurality of SIMS and is visible to the plurality of SIMS; and
provide to the first SIM an access to the in-device hotspot for transferring the data to the first network service through a second network service of the second SIM.

* * * * *